(12) United States Patent
Patel et al.

(10) Patent No.: US 11,630,844 B2
(45) Date of Patent: Apr. 18, 2023

(54) SYSTEM AND METHOD FOR AUGMENTING SYNCED DATA ACROSS MULTIPLE SYSTEMS TO FACILITATE DATA CLEANSING

(71) Applicant: salesforce.com, inc., San Francisco, CA (US)

(72) Inventors: Yogesh Patel, Dublin, CA (US); Birva Joshi, Sunnyvale, CA (US); Shan-Cheng Ho, Sunnyvale, CA (US); Mahalaxmi Sanathkumar, San Francisco, CA (US); Priya Sethuraman, Fremont, CA (US)

(73) Assignee: salesforce.com, inc.

( * ) Notice: Subject to any disclaimer, the term of this patent is extended or adjusted under 35 U.S.C. 154(b) by 110 days.

(21) Appl. No.: 17/248,574

(22) Filed: Jan. 29, 2021

(65) Prior Publication Data

US 2022/0245170 A1    Aug. 4, 2022

(51) Int. Cl.
*G06F 16/27* (2019.01)
*G06F 16/23* (2019.01)

(52) U.S. Cl.
CPC ........ *G06F 16/273* (2019.01); *G06F 16/2365* (2019.01)

(58) Field of Classification Search
CPC ..................... G06F 16/273; G06F 16/2365
USPC ........................................................ 707/613
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |

(Continued)

*Primary Examiner* — James Trujillo
*Assistant Examiner* — Fariborz Khoshnoodi
(74) *Attorney, Agent, or Firm* — LKGlobal | Lorenz & Kopf, LLP

(57) ABSTRACT

A method of syncing data across multiple systems includes: receiving a plurality of calendar events from a plurality of independent calendar systems that use different calendar system specific schemas; aggregating the calendar events at a unifying communication system; converting the calendar events from a calendar system specific schema to a unifying communication system specific schema; storing the plurality of calendar events in the unifying communication system specific schema; converting a calendar event received from a non-master calendar system to the master calendar system specific schema; and sending the converted calendar event to the master calendar system; wherein copies of the received calendar events that are formatted according to the calendar system specific schema of the master calendar system are stored with the master calendar system, and copies of the calendar events that are formatted according to the unifying communication system specific schema are stored with the unifying communication system.

17 Claims, 5 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,854,411 B2 * | 12/2017 | Bargetzi ............... H04W 4/80 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0162247 A1 * | 7/2008 | Hurmola ............ G06Q 10/1097 |
| | | 705/7.18 |
| 2008/0249972 A1 | 10/2008 | Dillon |
| 2009/0063414 A1 | 3/2009 | White et al. |
| 2009/0100342 A1 | 4/2009 | Jakobson |
| 2009/0112986 A1 * | 4/2009 | Caceres ............... G06Q 10/109 |
| | | 709/204 |
| 2009/0177744 A1 | 7/2009 | Marlow et al. |
| 2010/0162105 A1 * | 6/2010 | Beebe ................ G06Q 10/1093 |
| | | 705/7.18 |
| 2011/0161453 A1 * | 6/2011 | Feliberti ............ G06Q 10/1095 |
| | | 709/207 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0282421 A1 * | 10/2013 | Graff .................. G06F 16/9535 |
| | | 705/14.27 |
| 2016/0098687 A1 * | 4/2016 | Lamons ............ G06Q 10/1095 |
| | | 705/7.19 |
| 2018/0189744 A1 * | 7/2018 | Frank .................. G06F 21/6218 |
| 2018/0275846 A1 * | 9/2018 | Perret ................ G06Q 10/1093 |
| 2019/0361849 A1 * | 11/2019 | Rogynskyy ........... H04L 67/535 |
| 2021/0049205 A1 * | 2/2021 | Frank .................... G06F 16/901 |

* cited by examiner

SYSTEM AND METHOD FOR AUGMENTING SYNCED DATA ACROSS MULTIPLE SYSTEMS TO FACILITATE DATA CLEANSING

TECHNICAL FIELD

Embodiments of the subject matter described herein relate generally to systems and methods for syncing data, and more particularly to systems and methods for syncing data in different formats between multiple computing systems.

BACKGROUND

Syncing calendars between two or more calendaring systems and keeping the data up to date when the two or more calendaring systems format calendar data in different manners can be complicated. Syncing the calendar data with CRM systems that can analyze the data and offer advanced metrics can further complicate matters.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of augmenting synced data across multiple systems to facilitate data cleansing is disclosed. The method includes: receiving a plurality of calendar events from a plurality of independent calendar systems (e.g., Salesforce Core, GMAIL, Exchange) including a master calendar system and one or more non-master calendar system, wherein the plurality of independent calendar systems use a different calendar system specific schema for representing event data, wherein the master calendar system (e.g., Salesforce Core) provides a master calendar of events; aggregating the received calendar events at a unifying communication system (e.g., SalesforceIQ), the unifying communication system including a controller configured to systematically communicate (e.g., via a crawler) with the plurality of independent calendar systems (and optionally other world wide web-based communication systems) to retrieve calendar events (and optionally other data including emails) involving a user; converting the plurality of calendar events from a calendar system specific schema to a unifying communication system specific schema by the unifying communication system (e.g., wherein the unifying communication system specific schema is different from each of the calendar system specific schemas for the plurality of independent calendar systems); storing the plurality of calendar events in the unifying communication system specific schema with the unifying communication system (e.g., in an activity database); converting, by the unifying communications system, an aggregated calendar event received from a non-master calendar system (e.g., GMAIL, Exchange) to the calendar system specific schema for the master calendar system; and sending, by the unifying communications system, the converted calendar event received from the non-master calendar system to the master calendar system; wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system (e.g., in the activity database) for analysis.

In another embodiment, a system for augmenting synced data across multiple systems to facilitate data cleansing is disclosed. The system includes a controller configured to: convert a plurality of calendar events from a calendar system specific schema to a unifying communication system specific schema (e.g., wherein the unifying communication system specific schema is different from each of the calendar system specific schemas for the plurality of independent calendar systems), the plurality of calendar events having been received from a plurality of independent calendar systems (e.g., Salesforce Core, GMAIL, Exchange) including a master calendar system and one or more non-master calendar system, wherein the plurality of independent calendar systems use a different calendar system specific schema for representing event data, wherein a master calendar system (e.g., Salesforce Core) provides a master calendar of events, wherein the plurality of calendar events having been aggregated at a unifying communication system (e.g., SalesforceIQ), the unifying communication system including a controller configured to systematically communicate (e.g., via a crawler) with the plurality of independent calendar systems (and optionally other world wide web-based communication systems) to retrieve calendar events (and optionally other data such as emails) involving a user; store the plurality of calendar events in the unifying communication system specific schema with the unifying communication system (e.g., in an activity database); convert an aggregated calendar event received from a non-master calendar system (e.g., GMAIL, Exchange) to the calendar system specific schema for the master calendar system; and send the converted calendar event received from the non-master calendar system to the master calendar system; wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system (e.g., in the activity database) for analysis.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
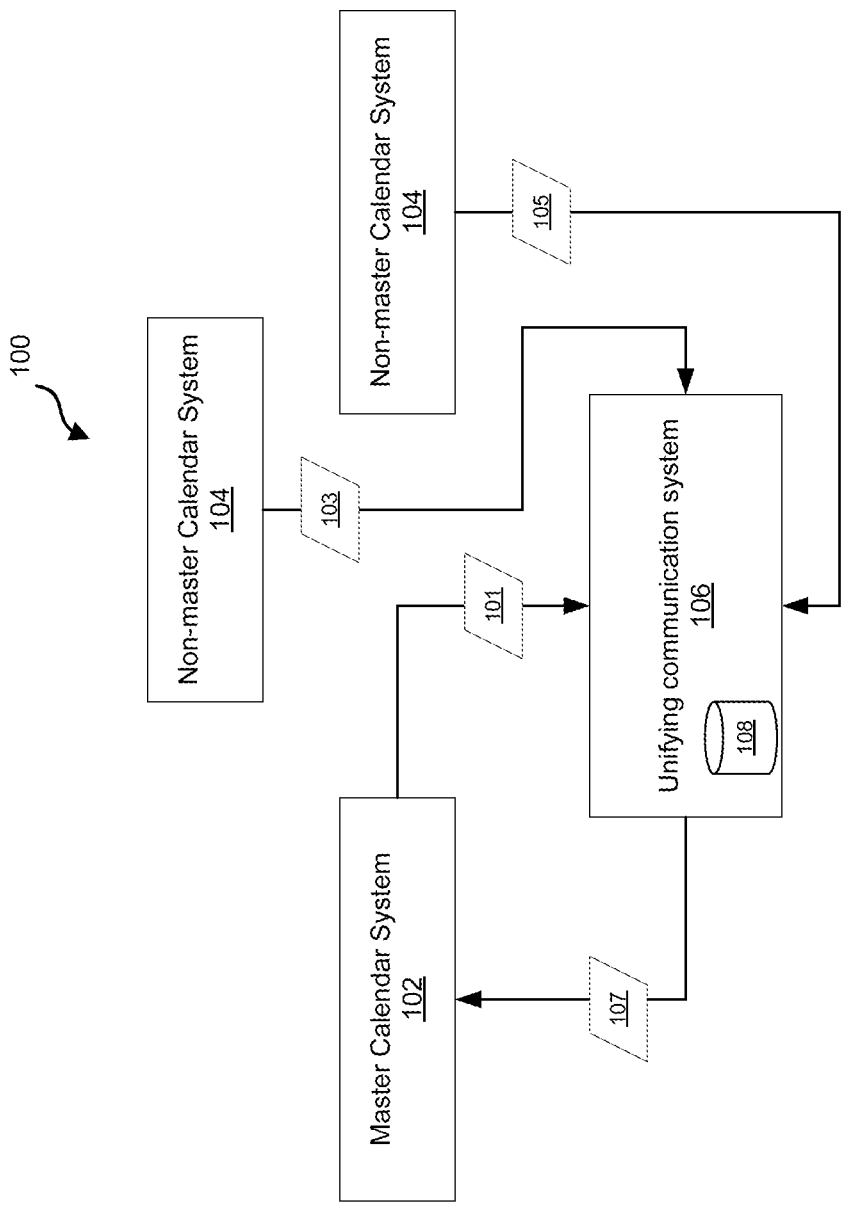
FIG. 1 is a block diagram depicting an example operating environment in which there is a need for syncing data across multiple systems, in accordance with some embodiments.

The subject matter described herein discloses apparatus, systems, techniques, and articles for syncing data across multiple systems. FIG. 1 is a block diagram depicting an example operating environment 100 in which there is a need for syncing data across multiple systems. The example operating environment 100 includes a plurality of independent calendar systems 102, 104 used by users for scheduling meetings, conversations, events, and the like and a unifying communication system 106. Examples of independent calendar systems 102, 104 may include, for example, the Salesforce Core system, GMAIL, various Microsoft exchange enabled systems, and others. Each independent calendar systems 102, 104 may create calendar events and may use a different calendar system specific schema for storing and representing event data (101, 103, 105). For example, Salesforce core may use a schema consistent with a sfdcRecordId aka sfdcActivityID, and an exchange enabled system may use a schema consistent with an iCalUID.

In the example operating environment 100, a user may desire that one of the independent calendar systems function as a master calendar system 102 and the other independent calendar systems function as non-master calendar systems 104. The master calendar system 102, in this example, maintains a master calendar that includes all calendar events generated for a user by each of the independent calendar systems 102, 104. The master calendar system 102 may represent event data as a core activity object, and the core activity object data model may support who (contact, lead, user) and what (account, opportunity). At the time of syncing calendar events, corresponding CRM records may be associated with other CRM entities to keep the most relevant information together.

To facilitate the maintaining of the master calendar by the master calendar system 102, the unifying communication system 106 is provided. The example unifying communication system 106 comprises a controller configured to execute a crawler for systematically communicating with the plurality of independent calendar systems (102, 104) and other world wide web-based communication systems to retrieve email, calendar events, and other data involving a user. The example unifying communication system 106 may execute CRM (customer relationship management) software to associate the data retrieved from crawling operations wherein information about events and the related CRM entities are unified for analysis to create a more wholistic view for a user. The example unifying communication system 106 may also provide other use cases such as activity metrics, timeline UI, and others.

The controller comprises at least one processor and a non-transitory computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The non-transitory computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The audience repository 102 is implemented using a computer readable storage device or media and is configured to store audience data.

The example operating environment 100 also includes an example unifying system associated with the unifying communication system 106 that is configured via a controller to receive a plurality of calendar events (101, 103, 105) from a plurality of independent calendar systems (102, 104) in the calendar system specific schema of its associated independent calendar system, aggregate the received calendar events (101, 103, 105), convert the plurality of calendar events from a calendar system specific schema to a unifying communication system specific schema, and store the plurality of calendar events in the unifying communication system specific schema, for example, in an activity database 108 at the unifying communication system. The unifying communication system specific schema may utilize a format such as (time: MEETING: hash (subject, attendees)). The example unifying communication system 106 is also configured via the controller to convert each aggregated calendar event (103, 105) received from non-master calendar systems 104 to the calendar system specific schema for the master calendar system (e.g., the master calendar system specific schema) and send the converted aggregated calendar events 107 received from non-master calendar systems 104 to the master calendar system 102 for storage (e.g., in an Oracle database) and use in compiling the master calendar.

In the example operating environment 100, copies of the plurality of calendar events (101, 103, 105) from the plurality of independent calendar systems (102, 104) are formatted according to the master calendar system specific schema and stored with the master calendar system 102. Also, copies of the plurality of calendar events (101, 103, 105) from the plurality of independent calendar systems (102, 104) are formatted according to the unifying communication system specific schema and stored in the activity database 108 for analysis.

The example unifying system is configured to handle differences in how the different independent calendar systems 102, 104 may handle recurring calendar events.

Figure 2:
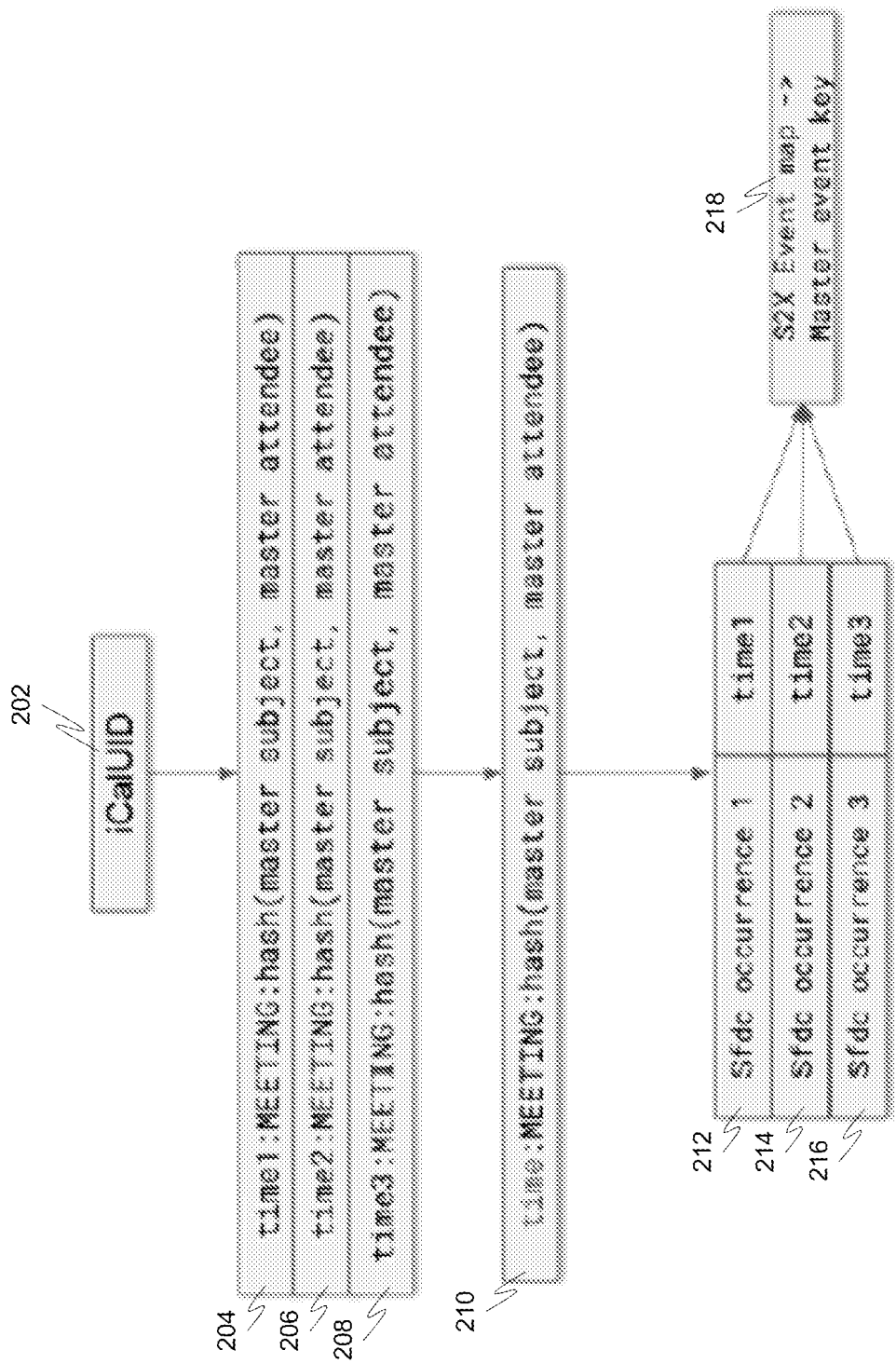
FIG. 2 is a data flow diagram for illustrating the handling of an example recurring event by an example unifying system, in accordance with some embodiments.

FIG. 2 is a data flow diagram for illustrating the handling of an example recurring event by the example unifying system. In this example, the unifying system receives a recurring event 202 as a single master record that identifies meeting details (e.g., subject, attendees, meeting times). In this example, the recurring event 202 has three meeting times.

The master calendar system 102 and unifying communication system 106 in this example, however, stores each instance of a recurring event as a separate object. In view of the different schemas applied by the master calendar system 102 and unifying communication system 106 for storing event data, the example unifying system applies different expansion policies for the master calendar system 102 and unifying communication system 106.

In this example, the unifying system expands the recurring event 202 as three instances using the unifying communication system specific schema—a first instance 204 at time 1, a second instance 206 at time 2, and a third instance 208 at time 3—for storage by the unifying communication system 106. A single master event key 218 is associated by the unifying communication system 106 with each recurring event instance (204, 206, 208).

The example unifying system uses the expanded instances 210 and the master event key to expand the recurring event 202 for the master calendar system 102. In this example, the unifying system also expands the recurring event 202 as three instances using the master communication system specific schema—a first instance 212 at time 1, a second instance 214 at time 2, and a third instance 216 at time 3. The master event key 218 is associated with each recurring event instance (212, 214, 216).

The expansion of the recurring event 202 and use of a master event key 218 allows an instance of a recurring event stored at the master calendar system 102 to be uniquely associated with the corresponding instance of the recurring event stored at the unifying communication system 106.

When a single instance of a recurring event is updated by a non-master calendar system 104, the example unifying system allows the update to be made to the corresponding instance of the recurring event at both the master calendar system 102 and the unifying communication system 106.

Figure 3:
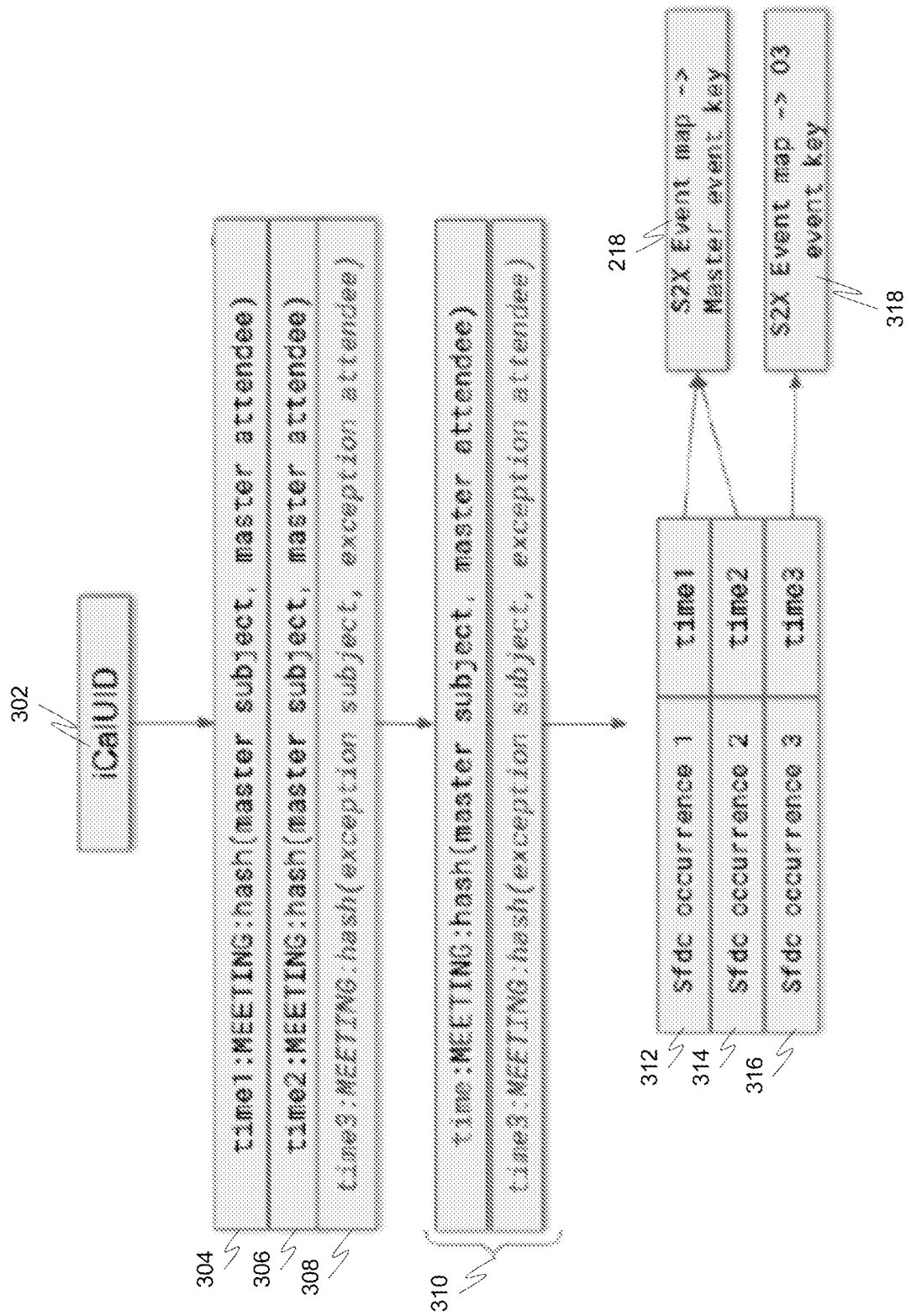
FIG. 3 is a is a data flow diagram for illustrating an example handling of a change to a single instance of an event in a recurring event by the example unifying system, in accordance with some embodiments.

FIG. 3 is a data flow diagram for illustrating an example handling of a change to a single instance of an event in a recurring event by the example unifying system. In this example, the unifying system receives an updated recurring event 302 as a single master record that identifies meeting details (e.g., subject, attendees, meeting times). In this example, the recurring event 302 has three meeting times.

In this example, the unifying system expands the recurring event 302 as three instances using the unifying communication system specific schema—a first instance 304 at time 1, a second instance 306 at time 2, and a third instance 308 at time 3—for storage by the unifying communication system 106. Because the first two instances (304, 306) do not include changes from a prior saved recurring event (202), no action is needed regarding those instances. Because the third instance 308 includes one or more changes that may be represented by exception subject and/or exception attendee, an exception event key 318 is associated by the unifying communication system 106 with the changed recurring event instance (308).

The example unifying system uses the expanded instances 310, the master event key 218, and the exception event key 318 to expand the recurring event 302 for the master calendar system 102. In this example, the unifying system also expands the recurring event 302 as three instances using the master communication system specific schema—a first instance 312 at time 1, a second instance 314 at time 2, and a third instance 316 at time 3. The master event key 218 is associated with each unchanged recurring event instance (312, 314) and the exception event key 318 is associated with the changed recurring event instance 316.

The expansion of the recurring event 302 and use of a master event key 218 and exception event key 318 allows an instance of a recurring event stored at the master calendar system 102 to be uniquely associated with the corresponding instance of the recurring event stored at the unifying communication system 106.

When an event or a single instance of a recurring event is updated by a master calendar system 102, the example unifying system allows the update to be made to the corresponding instance of the event at the unifying communication system 106.

Figure 4:
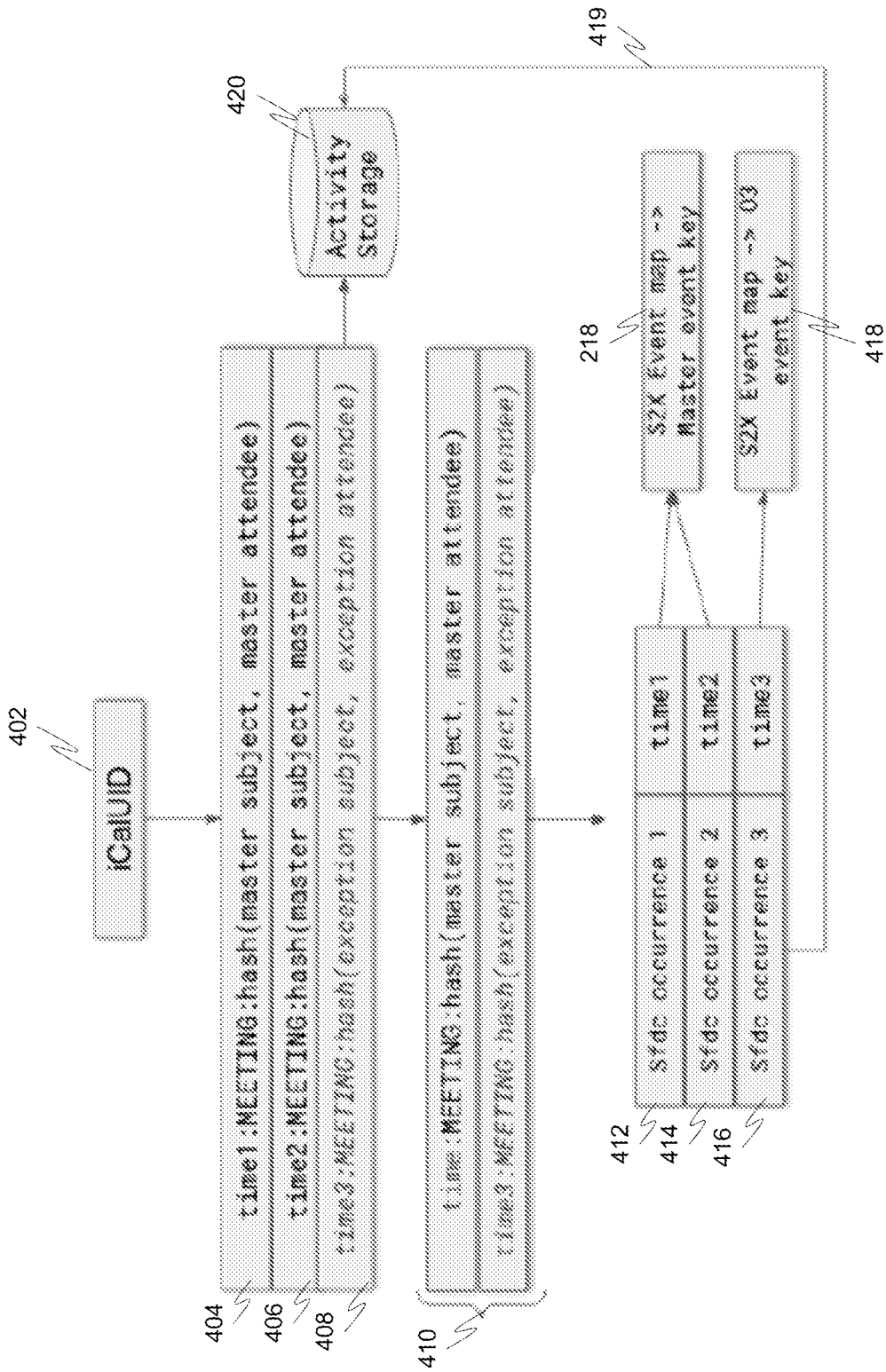
FIG. 4 is a is a is a data flow diagram for illustrating an example handling of a change to a single instance of an event in a recurring event by the example unifying system, in accordance with some embodiments.

FIG. 4 is a data flow diagram for illustrating an example handling of a change to a single instance of an event in a recurring event by the example unifying system. In this example, the unifying system receives an updated recurring event 402 as a single master record that identifies meeting details (e.g., subject, attendees, meeting times). In this example, the recurring event 402 has three meeting times.

In this example, the unifying system expands the recurring event 402 as three instances using the unifying communication system specific schema—a first instance 404 at time 1, a second instance 406 at time 2, and a third instance 408 at time 3—for storage by the unifying communication system 106. Because the first two instances (404, 406) do not include changes from a prior saved recurring event (202), no action is needed regarding those instances. Because the third instance 408 includes one or more changes that may be represented by exception subject and/or exception attendee, an exception event key 418 is associated by the unifying communication system 106 with the changed recurring event instance (408).

The example unifying system uses the expanded instances 410, the master event key 218, and the exception event key 418 to expand the recurring event 402 for the master calendar system 102. In this example, the unifying system also expands the recurring event 402 as three instances using the master communication system specific schema—a first instance 412 at time 1, a second instance 414 at time 2, and a third instance 416 at time 3. The master event key 218 is associated with each unchanged recurring event instance (412, 414) and the exception event key 418 is associated with the changed recurring event instance 416.

The expansion of the recurring event 402 and use of a master event key 218 and exception event key 418 allows an instance of a recurring event stored at the master calendar system 102 to be uniquely associated with the corresponding instance of the recurring event stored at the unifying communication system 106.

When an event or a single instance of a recurring event is updated by a master calendar system 102, the example unifying system allows the update to be made to the corresponding instance of the event at the unifying communication system 106. Updates can be sent (operation 419) to the communication system 106 for storage in the activity storage 420 and the updates can be associated with prior events or event instances stored in the activity storage 420 via a master event key and/or an exception event key so that the same event is not duplicated and is updated appropriately.

Figure 5:
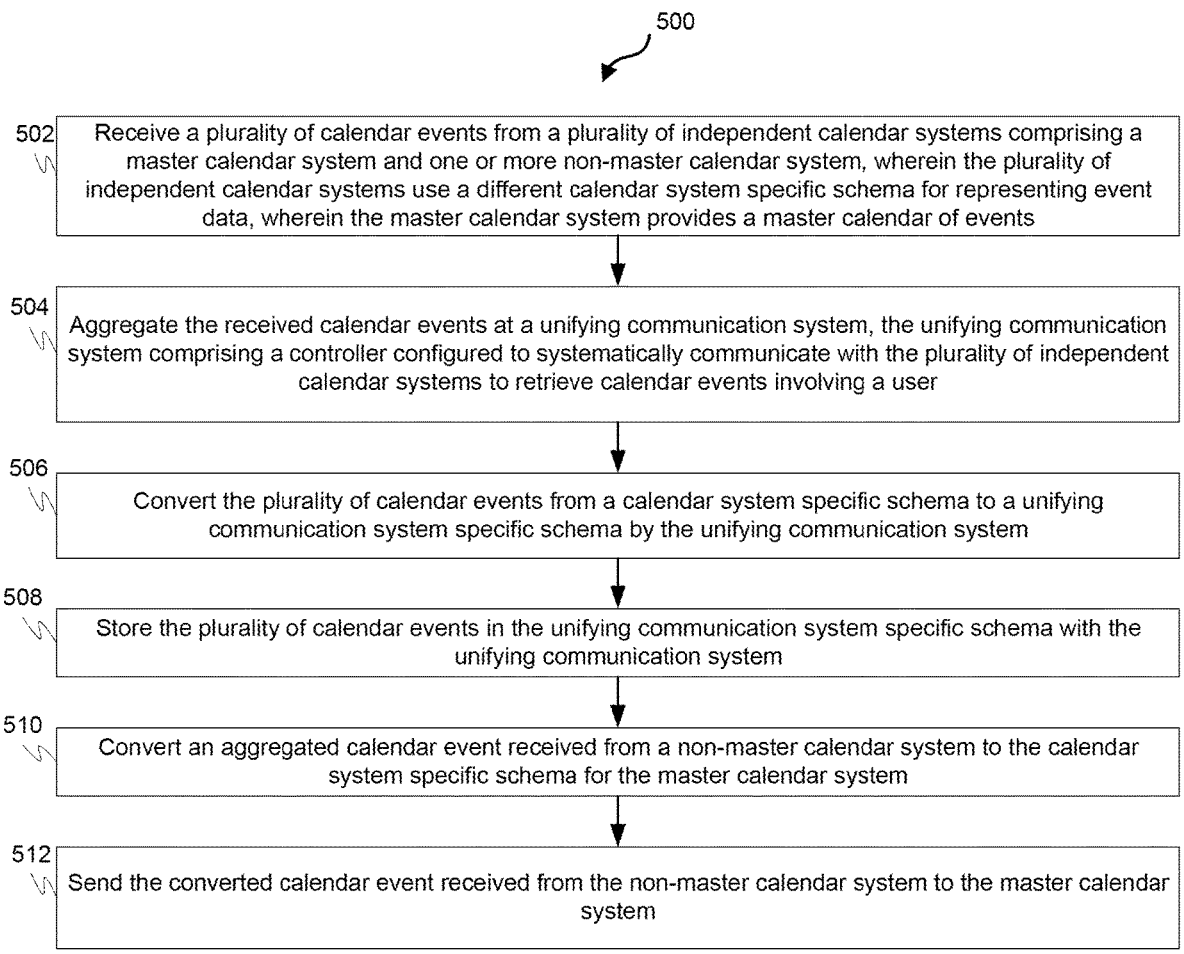
FIG. 5 is a process flow chart depicting an example process 500 of augmenting synced data across multiple systems, in accordance with some embodiments.

FIG. 5 is a process flow chart depicting an example process 500 of augmenting synced data across multiple systems. The order of operation within the example process 500 is not limited to the sequential execution as illustrated in the figure, but may be performed in one or more varying orders as applicable and in accordance with the present disclosure.

The example process 500 includes receiving a plurality of calendar events from a plurality of independent calendar systems comprising a master calendar system and one or more non-master calendar system, wherein the plurality of independent calendar systems use a different calendar system specific schema for representing event data, wherein the master calendar system provides a master calendar of events (operation 502). The receiving may comprise receiving a recurring calendar event from a first non-master calendar system, wherein the recurring calendar event comprises a master record that identifies a recurring time and frequency of a meeting; and the converting to the unifying communication system specific schema comprises expanding the master record to a plurality of separate instances for storage in the activity database wherein each instance represents a single occurrence for the recurring calendar event and is formatted according to the unifying communication system specific schema The example process 500 includes aggregating the received calendar events at a unifying communication system, the unifying communication system comprising a controller configured to systematically communicate with the plurality of independent calendar systems to retrieve calendar events involving a user (operation 504).

The example process 500 includes converting the plurality of calendar events from a calendar system specific schema to a unifying communication system specific schema by the unifying communication system (operation 506).

The example process 500 includes storing the plurality of calendar events in the unifying communication system specific schema with the unifying communication system (operation 508). The plurality of calendar events in the unifying communication system specific schema may be stored in an activity database.

The example process 500 includes converting, by the unifying communications system, an aggregated calendar event received from a non-master calendar system to the calendar system specific schema for the master calendar system (operation 510). The converting to the calendar system specific schema for the master calendar system may comprise expanding the master record to a plurality of separate instances wherein each instance represents a single occurrence for the recurring calendar event and is formatted according to the calendar system specific schema for the master calendar system.

The example process 500 includes sending, by the unifying communications system, the converted calendar event received from the non-master calendar system to the master calendar system (operation 512). Sending the converted calendar event to the master calendar system may comprise sending a master event key associated with the plurality of separate instances that are formatted according to the unifying communication system specific schema along with the separate instances that are formatted according to the calendar system specific schema for the master calendar system. Sending the converted instance to the master calendar system may comprise sending a unique event key associated with the corresponding instance that is formatted according to the unifying communication system specific schema to the master calendar system along with the converted instance.

This results in copies of the received plurality of calendar events from the plurality of independent calendar systems that are formatted according to the calendar system specific schema of the master calendar system being stored with the master calendar system, and copies of the received plurality of calendar events from the plurality of independent calendar systems that are formatted according to the unifying communication system specific schema being stored with the unifying communication system (e.g., in the activity database) for analysis.

The method may further comprise: receiving an update for a single instance of the recurring calendar event from the first non-master calendar system; identifying a corresponding instance that is formatted according to the unifying communication system specific schema; updating and storing the corresponding instance that is formatted according to the unifying communication system specific schema; converting the corresponding instance that is formatted according to the unifying communication system specific schema to the calendar system specific schema for the master calendar system; and sending the converted instance to the master calendar system.

The method may further comprise: generating a calendar event at the master calendar system based on a calendar event received by the master calendar system via the unifying communication system from a non-master calendar system; sending a copy of the generated calendar event to the unifying communication system along with a master event key associated with the calendar event received via the unifying communication system; recognizing, at the unifying communication system, the master event key as corresponding to an event currently stored in the activity database; and responsive to recognizing the master event key as corresponding to an event currently stored in the activity database, not converting the generated calendar event to a unifying communication system specific schema and not storing the generated calendar event in the activity database.

The subject matter described herein discloses apparatus, systems, techniques, and articles for syncing data across multiple systems. In one embodiment, a method of augmenting synced data across multiple systems to facilitate data cleansing is provided. The method comprises: receiving a plurality of calendar events from a plurality of independent calendar systems (e.g., Salesforce Core, GMAIL, Exchange) comprising a master calendar system and one or more non-master calendar system, wherein the plurality of independent calendar systems use a different calendar system specific schema for representing event data, wherein the master calendar system (e.g., Salesforce Core) provides a master calendar of events; aggregating the received calendar events at a unifying communication system (e.g., SalesforceIQ), the unifying communication system comprising a controller configured to systematically communicate (e.g., via a crawler) with the plurality of independent calendar systems (and optionally other world wide web-based communication systems) to retrieve calendar events (and optionally other data including emails) involving a user; converting the plurality of calendar events from a calendar system specific schema to a unifying communication system specific schema by the unifying communication system (e.g., wherein the unifying communication system specific schema is different from each of the calendar system specific schemas for the plurality of independent calendar systems); storing the plurality of calendar events in the unifying communication system specific schema with the unifying communication system (e.g., in an activity database); converting, by the unifying communications system, an aggregated calendar event received from a non-master calendar system (e.g., GMAIL, Exchange) to the calendar system specific schema for the master calendar system; and sending, by the unifying communications system, the converted calendar event received from the non-master calendar system to the master calendar system; wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system (e.g., in the activity database) for analysis.

These aspects and other embodiments may include one or more of the following features. The receiving may comprise receiving a recurring calendar event from a first non-master calendar system (e.g., GMAIL, Exchange), wherein the recurring calendar event comprises a master record that identifies a recurring time and frequency of a meeting; and the converting to the unifying communication system specific schema may comprise expanding the master record to a plurality of separate instances for storage with the unifying communication system (e.g., in the activity database) wherein each instance represents a single occurrence for the recurring calendar event and is formatted according to the unifying communication system specific schema.

The converting to the calendar system specific schema for the master calendar system may comprise expanding the master record to a plurality of separate instances wherein each instance represents a single occurrence for the recurring calendar event and is formatted according to the calendar system specific schema for the master calendar system.

The sending the converted calendar event to the master calendar system may comprise sending a master event key associated with the plurality of separate instances that are formatted according to the unifying communication system specific schema along with the separate instances that are formatted according to the calendar system specific schema for the master calendar system.

The method may further comprise: receiving an update for a single instance of the recurring calendar event from the first non-master calendar system; identifying a corresponding instance that is formatted according to the unifying communication system specific schema; updating and storing the corresponding instance that is formatted according to the unifying communication system specific schema; converting the corresponding instance that is formatted according to the unifying communication system specific schema to the calendar system specific schema for the master calendar system; and sending the converted instance to the master calendar system.

The sending the converted instance to the master calendar system may comprise sending a unique event key associated with the corresponding instance that is formatted according to the unifying communication system specific schema to the master calendar system along with the converted instance.

The method may further comprise: generating a calendar event at the master calendar system based on a calendar event received by the master calendar system via the unifying communication system from a non-master calendar system; sending a copy of the generated calendar event to the unifying communication system along with a master event key associated with the calendar event received via the unifying communication system; recognizing, at the unifying communication system, the master event key as corresponding to an event currently stored with the unifying communication system (e.g., in the activity database); and responsive to recognizing the master event key as corresponding to an event currently stored with the unifying communication system (e.g., in the activity database), not converting the generated calendar event to the unifying communication system specific schema and not storing the generated calendar event with the unifying communication system (e.g., in the activity database).

In another embodiment, a system for augmenting synced data across multiple systems to facilitate data cleansing is provided. The system comprises a controller configured to: convert a plurality of calendar events from a calendar system specific schema to a unifying communication system specific schema (e.g., wherein the unifying communication system specific schema is different from each of the calendar system specific schemas for the plurality of independent calendar systems), the plurality of calendar events having been received from a plurality of independent calendar systems (e.g., Salesforce Core, GMAIL, Exchange) comprising a master calendar system and one or more non-master calendar system, wherein the plurality of independent calendar systems use a different calendar system specific schema for representing event data, wherein a master calendar system (e.g., Salesforce Core) provides a master calendar of events, wherein the plurality of calendar events having been aggregated at a unifying communication system (e.g., SalesforceIQ), the unifying communication system comprising a controller configured to systematically communicate (e.g., via a crawler) with the plurality of independent calendar systems (and optionally other world wide web-based communication systems) to retrieve calendar events (and optionally other data such as emails) involving a user; store the plurality of calendar events in the unifying communication system specific schema with the unifying communication system (e.g., in an activity database); convert an aggregated calendar event received from a non-master calendar system (e.g., GMAIL, Exchange) to the calendar system specific schema for the master calendar system; and send the converted calendar event received from the non-master calendar system to the master calendar system; wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system (e.g., in the activity database) for analysis.

These aspects and other embodiments may include one or more of the following features. The controller may be further configured to: receive a recurring calendar event from a first non-master calendar system (e.g., GMAIL, Exchange), wherein the recurring calendar event comprises a master record that identifies a recurring time and frequency of a meeting; and expand the master record to a plurality of separate instances for storage with the unifying communication system (e.g., in the activity database) wherein each instance represents a single occurrence for the recurring calendar event and is formatted according to the unifying communication system specific schema The controller may be further configured to expand the master record to a plurality of separate instances wherein each instance represents a single occurrence for the recurring calendar event and is formatted according to the calendar system specific schema for the master calendar system.

The controller may be further configured to send a master event key associated with the plurality of separate instances that are formatted according to the unifying communication system specific schema along with the separate instances that are formatted according to the calendar system specific schema for the master calendar system.

The controller may be further configured to: receive an update for a single instance of the recurring calendar event from the first non-master calendar system; identify a corresponding instance that is formatted according to the unifying communication system specific schema; update and store the corresponding instance that is formatted according to the unifying communication system specific schema; convert the corresponding instance that is formatted according to the unifying communication system specific schema to the calendar system specific schema for the master calendar system; and send the converted instance to the master calendar system.

The controller may be further configured to send a unique event key associated with the corresponding instance that is formatted according to the unifying communication system specific schema to the master calendar system along with the converted instance.

Responsive to a calendar event being generated at the master calendar system based on a calendar event received by the master calendar system via the unifying communication system from a non-master calendar system, and responsive to a copy of the generated calendar event being sent to the unifying communication system along with a master event key associated with the calendar event received via the unifying communication system, the controller may be further configured to; recognize, at the unifying communication system, the master event key as corresponding to an event currently stored with the unifying communication system (e.g., in the activity database); and responsive to recognizing the master event key as corresponding to an event currently stored with the unifying communication system (e.g., in the activity database), not convert the generated calendar event to the unifying communication system specific schema and not store the generated calendar event with the unifying communication system (e.g., in the activity database).

In another embodiment, non-transitory computer readable media encoded with programming instructions configurable to cause a controller to perform a method is provided. The method comprises: receiving a plurality of calendar events from a plurality of independent calendar systems (e.g., Salesforce Core, GMAIL, Exchange) comprising a master calendar system and one or more non-master calendar system, wherein the plurality of independent calendar systems use a different calendar system specific schema for representing event data, wherein the master calendar system (e.g., Salesforce Core) provides a master calendar of events; aggregating the received calendar events at a unifying communication system (e.g., SalesforceIQ), the unifying communication system comprising a controller configured to systematically communicate (e.g., via a crawler) with the plurality of independent calendar systems (and optionally other world wide web-based communication systems) to retrieve calendar events (and optionally other data including emails) involving a user; converting the plurality of calendar events from a calendar system specific schema to a unifying communication system specific schema by the unifying communication system (e.g., wherein the unifying communication system specific schema is different from each of the calendar system specific schemas for the plurality of independent calendar systems); storing the plurality of calendar events in the unifying communication system specific schema with the unifying communication system (e.g., in an activity database); converting, by the unifying communications system, an aggregated calendar event received from a non-master calendar system (e.g., GMAIL, Exchange) to the calendar system specific schema for the master calendar system; and sending, by the unifying communications system, the converted calendar event received from the non-master calendar system to the master calendar system; wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system (e.g., in the activity database) for analysis.

These aspects and other embodiments may include one or more of the following features. The receiving may comprise receiving a recurring calendar event from a first non-master calendar system (e.g., GMAIL, Exchange), wherein the recurring calendar event comprises a master record that identifies a recurring time and frequency of a meeting; and the converting to the unifying communication system specific schema may comprise expanding the master record to a plurality of separate instances for storage with the unifying communication system (e.g., in the activity database) wherein each instance represents a single occurrence for the recurring calendar event and is formatted according to the unifying communication system specific schema.

The converting to the calendar system specific schema for the master calendar system may comprise expanding the master record to a plurality of separate instances wherein each instance represents a single occurrence for the recurring calendar event and is formatted according to the calendar system specific schema for the master calendar system.

The sending the converted calendar event to the master calendar system may comprise sending a master event key associated with the plurality of separate instances that are formatted according to the unifying communication system specific schema along with the separate instances that are formatted according to the calendar system specific schema for the master calendar system.

The method may further comprise: receiving an update for a single instance of the recurring calendar event from the first non-master calendar system; identifying a corresponding instance that is formatted according to the unifying communication system specific schema; updating and storing the corresponding instance that is formatted according to the unifying communication system specific schema; converting the corresponding instance that is formatted according to the unifying communication system specific schema to the calendar system specific schema for the master calendar system; and sending the converted instance to the master calendar system.

The sending the converted instance to the master calendar system may comprise sending a unique event key associated with the corresponding instance that is formatted according to the unifying communication system specific schema to the master calendar system along with the converted instance.

The method may further comprise: generating a calendar event at the master calendar system based on a calendar event received by the master calendar system via the unifying communication system from a non-master calendar system; sending a copy of the generated calendar event to the unifying communication system along with a master event key associated with the calendar event received via the unifying communication system; recognizing, at the unifying communication system, the master event key as corresponding to an event currently stored with the unifying communication system (e.g., in the activity database); and responsive to recognizing the master event key as corresponding to an event currently stored with the unifying communication system (e.g., in the activity database), not converting the generated calendar event to the unifying communication system specific schema and not storing the generated calendar event with the unifying communication system (e.g., in the activity database).

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of augmenting synced data across multiple systems to facilitate data cleansing, the method comprising:
receiving a plurality of calendar events from a plurality of independent calendar systems comprising a master calendar system and one or more non-master calendar systems, wherein the plurality of independent calendar systems use a different calendar system specific schema for representing event data, wherein the master calendar system provides a master calendar of events;

aggregating the received calendar events at a unifying communication system, the unifying communication system comprising a controller configured to systematically communicate with the plurality of independent calendar systems to retrieve calendar events involving a user;

converting the plurality of calendar events from a calendar system specific schema to a unifying communication system specific schema by the unifying communication system;

storing the plurality of calendar events in the unifying communication system specific schema with the unifying communication system;

converting, by the unifying communications system, an aggregated calendar event received from a non-master calendar system to the calendar system specific schema for the master calendar system;

sending, by the unifying communications system, the converted calendar event received from the non-master calendar system to the master calendar system;

wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system for analysis;

receiving a recurring calendar event from a first non-master calendar system, wherein the recurring calendar event comprises a master record that identifies a recurring time and frequency of a meeting;

receiving an update for a single instance of the recurring calendar event from the first non-master calendar system;

identifying a corresponding instance that is formatted according to the unifying communication system specific schema;

updating and storing the corresponding instance that is formatted according to the unifying communication system specific schema;

converting the corresponding instance that is formatted according to the unifying communication system specific schema to the calendar system specific schema for the master calendar system; and sending the converted instance to the master calendar system.

2. The method of claim 1, wherein the converting to the unifying communication system specific schema comprises expanding the master record to a plurality of separate instances for storage with the unifying communication system wherein each instance represents a single occurrence for the recurring calendar event and is formatted according to the unifying communication system specific schema.

3. The method of claim 2, wherein the converting to the calendar system specific schema for the master calendar system comprises expanding the master record to a plurality of separate instances wherein each instance represents a single occurrence for the recurring calendar event and is formatted according to the calendar system specific schema for the master calendar system.

4. The method of claim 3, wherein the sending the converted calendar event to the master calendar system comprises sending a master event key associated with the plurality of separate instances that are formatted according to the unifying communication system specific schema along with the separate instances that are formatted according to the calendar system specific schema for the master calendar system.

5. The method of claim 4, wherein the sending the converted instance to the master calendar system comprises sending a unique event key associated with the corresponding instance that is formatted according to the unifying communication system specific schema to the master calendar system along with the converted instance.

6. The method of claim 5, further comprising:

generating a calendar event at the master calendar system based on a calendar event received by the master calendar system via the unifying communication system from a non-master calendar system;

sending a copy of the generated calendar event to the unifying communication system along with a master event key associated with the calendar event received via the unifying communication system;

recognizing, at the unifying communication system, the master event key as corresponding to an event currently stored with the unifying communication system; and responsive to recognizing the master event key as corresponding to an event currently stored with the unifying communication system, not converting the generated calendar event to the unifying communication system specific schema, and not storing the generated calendar event with the unifying communication system.

7. A system for augmenting synced data across multiple systems to facilitate data cleansing, the system comprising a controller configured to:

convert a plurality of calendar events from a calendar system specific schema to a unifying communication system specific schema, the plurality of calendar events having been received from a plurality of independent calendar systems comprising a master calendar system and one or more non-master calendar systems, wherein the plurality of independent calendar systems use a different calendar system specific schema for representing event data, wherein a master calendar system provides a master calendar of events, wherein the plurality of calendar events having been aggregated at a unifying communication system, the unifying communication system comprising a controller configured to systematically communicate with the plurality of independent calendar systems to retrieve calendar events involving a user;

store the plurality of calendar events in the unifying communication system specific schema with the unifying communication system;

convert an aggregated calendar event received from a non-master calendar system to the calendar system specific schema for the master calendar system; and send the converted calendar event received from the non-master calendar system to the master calendar system;

wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system for analysis;

receive a recurring calendar event from a first non-master calendar system, wherein the recurring calendar event comprises a master record that identifies a recurring time and frequency of a meeting;

receive an update for a single instance of the recurring calendar event from the first non-master calendar system;

identify a corresponding instance that is formatted according to the unifying communication system specific schema;

update and store the corresponding instance that is formatted according to the unifying communication system specific schema;

convert the corresponding instance that is formatted according to the unifying communication system specific schema to the calendar system specific schema for the master calendar system; and send the converted instance to the master calendar system.

8. The system of claim 7, wherein the controller is further configured to expand the master record to a plurality of separate instances for storage with the unifying communication system wherein each instance represents a single occurrence for the recurring calendar event and is formatted according to the unifying communication system specific schema.

9. The system of claim 8, wherein the controller is further configured to expand the master record to a plurality of separate instances wherein each instance represents a single occurrence for the recurring calendar event and is formatted according to the calendar system specific schema for the master calendar system.

10. The system of claim 9, wherein the controller is further configured to send a master event key associated with the plurality of separate instances that are formatted according to the unifying communication system specific schema along with the separate instances that are formatted according to the calendar system specific schema for the master calendar system.

11. The system of claim 10, wherein the controller is further configured to send a unique event key associated with the corresponding instance that is formatted according to the unifying communication system specific schema to the master calendar system along with the converted instance.

12. The system of claim 11, wherein responsive to a calendar event being generated at the master calendar system based on a calendar event received by the master calendar system via the unifying communication system from a non-master calendar system, and responsive to a copy of the generated calendar event being sent to the unifying communication system along with a master event key associated with the calendar event received via the unifying communication system, the controller is further configured to;

recognize, at the unifying communication system, the master event key as corresponding to an event currently stored with the unifying communication system; and responsive to recognizing the master event key as corresponding to an event currently stored with the unifying communication system, not convert the generated calendar event to the unifying communication system specific schema and not store the generated calendar event with the unifying communication system.

13. Non-transitory computer readable media encoded with programming instructions configurable to cause a controller to perform a method, the method comprising:

receiving a plurality of calendar events from a plurality of independent calendar systems comprising a master calendar system and one or more non-master calendar systems, wherein the plurality of independent calendar systems use a different calendar system specific schema for representing event data, wherein the master calendar system provides a master calendar of events;

aggregating the received calendar events at a unifying communication system, the unifying communication system comprising a controller configured to systematically communicate with the plurality of independent calendar systems to retrieve calendar events involving a user;

converting the plurality of calendar events from a calendar system specific schema to a unifying communication system specific schema by the unifying communication system;

storing the plurality of calendar events in the unifying communication system specific schema with the unifying communication system;

converting, by the unifying communications system, an aggregated calendar event received from a non-master calendar system to the calendar system specific schema for the master calendar system;

sending, by the unifying communications system, the converted calendar event received from the non-master calendar system to the master calendar system;

wherein copies of the received plurality of calendar events from the plurality of independent calendar systems that are formatted according to the calendar system specific schema of the master calendar system are stored with the master calendar system, and copies of the received plurality of calendar events from the plurality of independent calendar systems that are formatted according to the unifying communication system specific schema are stored with the unifying communication system for analysis;

receiving a recurring calendar event from a first non-master calendar system, wherein the recurring calendar event comprises a master record that identifies a recurring time and frequency of a meeting;

receiving an update for a single instance of the recurring calendar event from the first non-master calendar system;

identifying a corresponding instance that is formatted according to the unifying communication system specific schema;

updating and storing the corresponding instance that is formatted according to the unifying communication system specific schema;

converting the corresponding instance that is formatted according to the unifying communication system specific schema to the calendar system specific schema for the master calendar system; and sending the converted instance to the master calendar system.

14. The non-transitory computer readable media of claim 13, wherein the converting to the unifying communication system specific schema comprises expanding the master record to a plurality of separate instances for storage with the unifying communication system wherein each instance represents a single occurrence for the recurring calendar event and is formatted according to the unifying communication system specific schema; and the converting to the calendar system specific schema for the master calendar system comprises expanding the master record to a plurality of separate instances wherein each instance represents a single occurrence for the recurring calendar event and is formatted according to the calendar system specific schema for the master calendar system.

15. The non-transitory computer readable media of claim 14, wherein the sending the converted calendar event to the master calendar system comprises sending a master event key associated with the plurality of separate instances that are formatted according to the unifying communication system specific schema along with the separate instances that are formatted according to the calendar system specific schema for the master calendar system.

16. The non-transitory computer readable media of claim 15, wherein the sending the converted instance to the master calendar system comprises sending a unique event key associated with the corresponding instance that is formatted according to the unifying communication system specific schema to the master calendar system along with the converted instance.

17. The non-transitory computer readable media of claim 16, wherein the method further comprises:

generating a calendar event at the master calendar system based on a calendar event received by the master calendar system via the unifying communication system from a non-master calendar system;

sending a copy of the generated calendar event to the unifying communication system along with a master event key associated with the calendar event received via the unifying communication system;

recognizing, at the unifying communication system, the master event key as corresponding to an event currently stored with the unifying communication system; and responsive to recognizing the master event key as corresponding to an event currently stored with the unifying communication system, not converting the generated calendar event to the unifying communication system specific schema, and not storing the generated calendar event with the unifying communication system.

* * * * *